(12) United States Patent
Fujiwara et al.

(10) Patent No.: US 11,352,036 B2
(45) Date of Patent: Jun. 7, 2022

(54) TERMINAL PROTECTION APPARATUS AND TERMINAL PROTECTION METHOD

(71) Applicant: KYOSAN ELECTRIC MFG. CO., LTD., Yokohama (JP)

(72) Inventors: Noritoshi Fujiwara, Kawasaki (JP); Shuji Nambu, Yokohama (JP); Toshifumi Nishi, Yokohama (JP); Kenji Mizuno, Sagamihara (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 193 days.

(21) Appl. No.: 16/364,520

(22) Filed: Mar. 26, 2019

(65) Prior Publication Data

US 2019/0217876 A1    Jul. 18, 2019

Related U.S. Application Data

(63) Continuation of application No. PCT/JP2016/079200, filed on Oct. 3, 2016.

(51) Int. Cl.
*B61L 27/20* (2022.01)
*B61L 27/04* (2006.01)
(Continued)

(52) U.S. Cl.
CPC ............. *B61L 27/20* (2022.01); *B60L 15/40* (2013.01); *B61L 3/125* (2013.01); *B61L 25/021* (2013.01);
(Continued)

(58) Field of Classification Search
CPC .... B61L 27/0038; B61L 3/125; B61L 25/021; B61L 27/04; B61L 3/008; B61L 2027/005; B60L 15/40; Y02T 90/16
See application file for complete search history.

(56) References Cited

U.S. PATENT DOCUMENTS

| | | | |
|---|---|---|---|
| 2002/0033637 A1 | 3/2002 | Fisher | |
| 2004/0069909 A1* | 4/2004 | Kane | B61L 23/047 246/167 R |

(Continued)

FOREIGN PATENT DOCUMENTS

| | | | |
|---|---|---|---|
| EP | 0970868 A1 | 1/2000 | |
| EP | 2210791 A1 * | 7/2010 | ............ B61L 25/025 |

(Continued)

*Primary Examiner* — Frederick M Brushaber
*Assistant Examiner* — Elizabeth Yang
(74) *Attorney, Agent, or Firm* — Muncy, Geissler, Olds & Lowe, P.C.

(57) ABSTRACT

A train activates an emergency brake when a Station Loop Coil (SLC) used for a stop-position determination function to determine whether the train has stopped at a stop target in a terminal becomes unable to be detected (non-detected state) before the train is determined to have stopped at a stop-position by the stop-position determination function after the SLC has been detected. Thus, the train can be prevented from colliding with a car stop disposed at an end of a track as a result of overrunning. In the terminal protection, an emergency brake or a service brake is activated also when a reception duration during which the SLC continues to be detected reaches a predetermined threshold time period, or when a traveling position of the train reaches a disposed position of the SLC but the SLC is not detected.

14 Claims, 4 Drawing Sheets

(51) Int. Cl.
  *B61L 25/02* (2006.01)
  *B61L 3/12* (2006.01)
  *B60L 15/40* (2006.01)
  *B61L 3/00* (2006.01)
(52) U.S. Cl.
  CPC ............... *B61L 27/04* (2013.01); *B61L 3/008* (2013.01); *B61L 2027/204* (2022.01); *Y02T 90/16* (2013.01)

(56) References Cited

U.S. PATENT DOCUMENTS

| | | | | |
|---|---|---|---|---|
| 2004/0124315 A1* | 7/2004 | Kane | ........................ | B61L 1/20 246/111 |
| 2005/0133673 A1* | 6/2005 | Sugita | ................. | B61L 27/0038 246/167 R |
| 2006/0195236 A1* | 8/2006 | Katsuta | ................... | B61L 23/24 701/19 |
| 2007/0100517 A1* | 5/2007 | Kim | ........................ | B61L 3/121 701/19 |
| 2015/0102177 A1* | 4/2015 | Tippey | ................ | B61L 27/0027 246/122 R |
| 2015/0329130 A1* | 11/2015 | Carlson | ................... | B61L 3/125 246/122 R |

FOREIGN PATENT DOCUMENTS

| | | | | |
|---|---|---|---|---|
| JP | 1994-327105 A | 11/1994 | | |
| JP | H06-078147 U | 11/1994 | | |
| JP | 3848541 B2 * | 11/2006 | | |
| KR | 101210439 B1 * | 12/2012 | | |
| KR | 101489886 B1 * | 5/2013 | ............. | B61L 23/14 |
| WO | 1998041435 A1 | 9/1998 | | |

\* cited by examiner

TERMINAL PROTECTION APPARATUS AND TERMINAL PROTECTION METHOD

CROSS REFERENCE TO RELATED APPLICATION

This application is a continuation of International Patent Application No. PCT/JP2016/079200, having an international filing date of Oct. 3, 2016, which designated the United States, the entirety of which is incorporated herein by reference.

BACKGROUND

Terminal protection is one essential function of a railroad safety apparatus. The function is for preventing an overrunning train from colliding with a car stop disposed at the end of a track in a terminal. Conventionally known terminal protection for Automatic Train Stop (ATS) and Automatic Train Control (ATC) employs the following methods. Specifically, a balise and a track circuit for the terminal protection are provided between a stop target and the end of a track, and an emergency brake is activated when a train that has passed through the stop target detects the balise or the track circuit. Furthermore, a time period required for traveling between two balises is calculated, and the emergency brake is activated when the traveling time period is shorter than a predetermined time period (see, for example, JP-A-1994-327105).

As described above, the methods employed for the conventional terminal protection require ground equipment dedicated for the terminal protection, such as the balise and the track circuit, to be installed. The ground equipment dedicated for the terminal protection needs to be installed at certain distance from the stop target so as not to hinder a normal operation of the train or so as not to be detected by the train stopped at the stop target. The terminal protection is implemented based on the detection of the ground equipment. In this context, the ground equipment needs to be redundantly provided with two balises disposed for example, because one ground equipment may fail. To satisfy all these conditions, a section (safety margin for overrunning) of a certain distance needs to be provided between the stop target and the end of the track, that is, the section (safety margin for overrunning) can only be reduced by a limited amount. Furthermore, whether the ground equipment is in a normal state or has failed cannot be determined until overrunning of the train actually occurs.

DESCRIPTION OF EXEMPLARY EMBODIMENTS

The following disclosure provides many different embodiments, or examples, for implementing different features of the provided subject matter. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected of coupled to each other with one or more other intervening elements in between.

The present disclosure is directed to implementing terminal protection for a train without providing dedicated ground equipment.

In accordance with one of some embodiments, there is provided a terminal protection apparatus installed in a train, the train including a receiver that receives a radio signal indicating a stop-position before the end of the track from a balise; and a stop-position determination function for determining whether or not the train has stopped at the stop-position based on the radio signal, the terminal protection apparatus being configured to perform:

detecting reception of the radio signal by the receiver; and activating a brake when a non-detected state is achieved before the train is determined to have stopped at the stop-position by the stop-position determination function after the detecting is performed. In accordance with one of some embodiments, there is provided a terminal protection method executed by an onboard system of a train to activate a brake, the method comprising:

determining whether or not the train has stopped at a stop-position before an end of a track based on a radio signal indicating the stop-position transmitted by a balise and received by a receiver installed on the train; and activating the brake when the receiver becomes unable to receive the radio signal before the train is determined to have stopped at the stop-position after the receiver has received the radio signal.

Thus, in some embodiments, the terminal protection of the train can be implemented at the terminal by using the balise used for the stop-position determination function, without additionally installing the ground equipment dedicated for the terminal protection. Specifically, the brake is activated when the radio signal becomes unable to be received from the balise before the train is determined to have stopped at the stop-position by the stop-position determination function after the reception of the radio signal from the balise has been detected. Thus, the terminal protection is implemented. The radio signal cannot be received from the balise when the train exceeds the stop-position where the train is supposed to stop (overrunning) or when the balise fails. Thus, the brake is activated in such a case. As a result, a section (safety margin for overrunning) between the stop-position as the stop target and the end of the track can be made shorter than a case where conventional terminal protection implemented with dedicated ground equipment installed is employed.

In accordance with one of some embodiments, there is provided a terminal protection apparatus further being configured to perform activating the brake when a reception duration during which the detecting is achieved reaches a predetermined time period before the train is determined to have stopped at the stop-position by the stop-position determination function.

Thus, in some embodiments, the brake can be activated when a reception duration during which the reception detection unit continues to detect the reception of the radio signal from the balise reaches a predetermined time period before the train is determined to have stopped at the stop-position by the stop-position determination function. An abnormal increase in a transmission output of the balise might occur due to a certain cause. As a result, an arriving range of the radio signal might be expanded. Still the brake can be appropriately activated. In the case described above, the state where the radio signal is received from the balise is maintained even when the train overruns the stop-position to a position where the radio signal is not received under a normal state of the balise. The terminal protection can be implemented to prevent such an incident from occurring.

In accordance with one of some embodiments, there is provided a terminal protection apparatus further being configured to perform measuring a traveling position; and activating the brake when the traveling position reaches the disposed position of the balise but the detecting is not achieved.

Thus, in some embodiments, the brake can be activated when the traveling position of the train reaches the disposed position of the balise but the reception detection unit does not detect the reception of the radio signal from the balise. When communication failure occurs between the onboard antenna of the train and the balise due to a certain cause, the train cannot receive a radio signal from the balise, and thus train might pass through the stop-position with the stop-position determination function failing to detect whether the train has stopped at the stop-position. The terminal protection can be implemented to prevent such an incident from occurring.

In accordance with one of some embodiments, there is provided a terminal protection apparatus further being configured to perform: receiving failure information on the balise; and activating the brake in response to the reception of the failure information.

Thus, in some embodiments, the brake can be activated in response to the reception of the failure information on the balise. When the balise fails, whether or not the train has stopped might be unable to be determined by the stop-position determination function, and the train might overrun the stop-position due to the failure to determine whether or not the train has stopped at the stop-position. The terminal protection can be implemented to prevent such an incident from occurring.

In accordance with one of some embodiments, there is provided a terminal protection apparatus further being configured to perform activating the brake when the non-detected state is achieved before given departure permission information is received after the stop-position determination function has determined that the train has stopped at the stop-position.

Thus, in some embodiments, the brake can be activated when the reception detection unit becomes unable to detect the reception of the radio signal from the balise before departure permission information is received after the stop-position determination function has determined that the train has stopped at the stop-position.

Erroneous departure of the train that has temporarily stopped at the stop-position might occur. The terminal protection can be implemented to prevent such an incident from occurring.

Detailed exemplary embodiments are described below with reference to the drawings.

[System Configuration]

Figure 1:
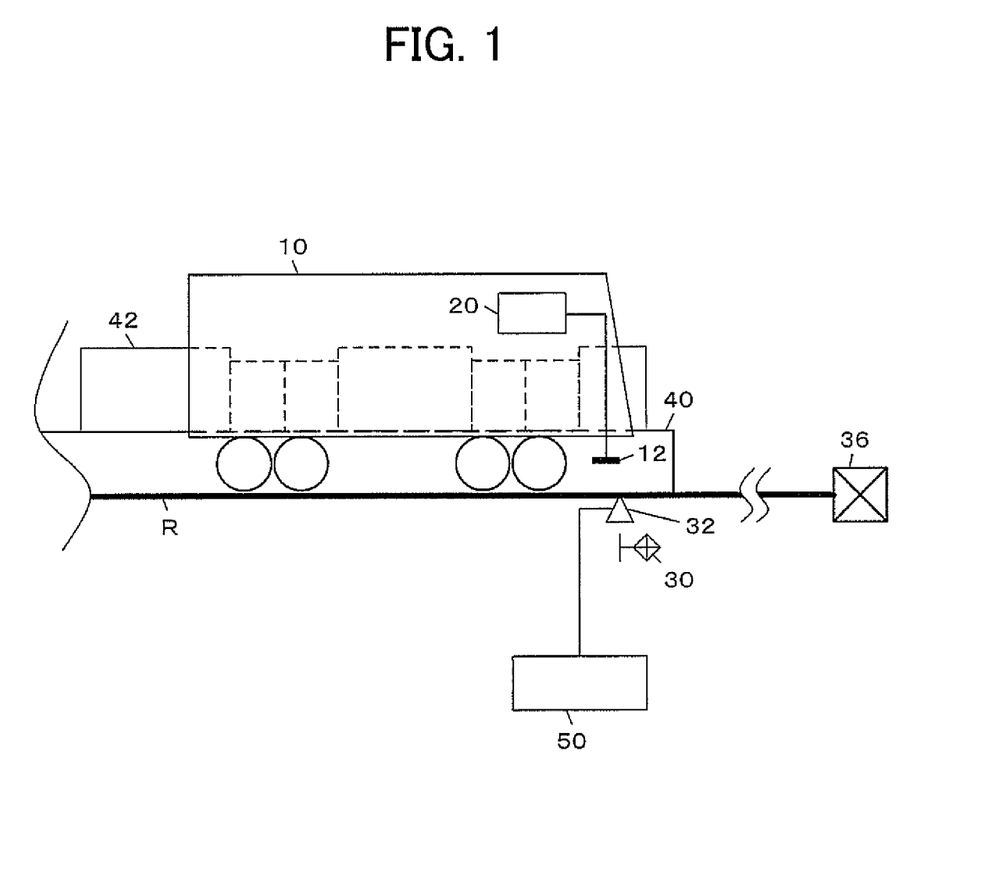
FIG. 1 is a diagram illustrating a schematic configuration of a train control system.

FIG. 1 is a diagram illustrating a schematic configuration of a train control system employing a terminal protection according to the present embodiment. The train control system according to the present embodiment described includes an Automatic Train Operation (ATO) system. Each station has a platform 40 with platform doors 42 and a platform track R provided with a Station Loop Coil (SLC) 32 (an ATO balise) that serves as a powered balise with a bidirectional communication function.

A train 10 has a stop-position determination function to receive a radio signal exchanged with the SLC 32 via an onboard antenna 12 serving as a receiver, and determine whether or not the train 10 has stopped at a stop target 30 at which vehicle doors 14 match openings of the platform doors 42. While the train 10 is stopped, open/close information on the vehicle doors 14 and the platform doors 42, next stop information, and the like are exchanged between the train 10 and a ground system 50 such as station's transmission equipment communicably connected to the SLC 32, via the onboard antenna 12 and the SLC 32. Thus, open/close control is performed on the vehicle doors 14 of the train 10 and the platform doors 42 of the platform 40 of the station where the train 10 is stopped. The train 10 further has a terminal protection function to receive a radio signal from the SLC 32 to prevent collision with a car stop 36 disposed at an end of the platform track R of a terminal. The train 10 has an onboard system 20 in charge of the vehicle side functions including the stop-position determination function, the terminal protection function, and the open/close control on the vehicle door 14. Thus, in the context focusing on the terminal protection function, the onboard system 20 may be referred to as a terminal protection apparatus.

[Terminal Protection Function]

Figure 2:
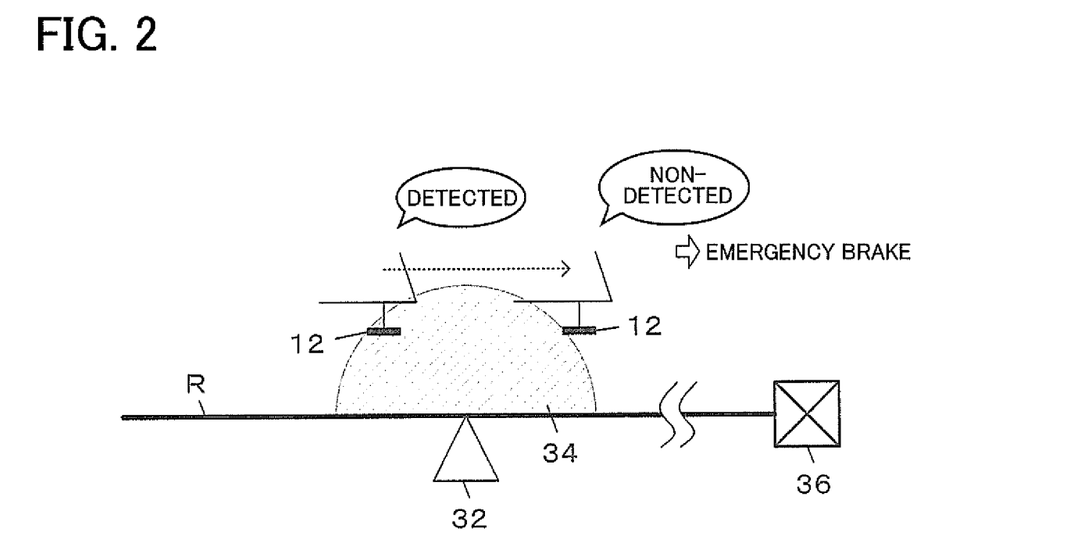
FIG. 2 is a diagram illustrating terminal protection.

FIG. 2 is a diagram illustrating the terminal protection function. FIG. 2 illustrates positional relationship between the onboard antenna 12 and a signal arriving range 34 of the SLC 32 in a case where the train 10 stops at a terminal, with a right direction corresponding to the forward direction of the train 10. The SLC 32 is a powered balise and emits radio signal constantly or at a short interval, when not in communication with the onboard antenna 12. The train 10 can receive the radio signal from the SLC 32 via the onboard antenna 12 of the train 10, while the onboard antenna 12 is positioned within the signal arriving range 34 of the SLC 32, This state where the radio signal is received from the SLC 32 via the onboard antenna 12 is referred to as a state where the SLC 32 is detected.

After the train 10 is stopped by the ATO function, the stop-position determination function of the onboard system 20 is activated to determine whether or not the train has stopped at the stop-position by determining whether or not the onboard antenna 12 is positioned to face the SLC 32 disposed at the stop target 30. While the train is stopped at a stop-position, the onboard system 20 performs onboard-ground communications via the onboard antenna 12 and the SLC 32.

At the terminal, the SLC 32 may be unable to be detected (non-detected state) before the train 10 "stops" or before departure permission information is received by the train 10 temporarily "stopped", after the SLC 32 has been detected. In such a case, the onboard system 20 determines that the train 10 has overrun the stop target 30 (overrunning) and activates an emergency brake to stop the train. The term "stopped" used for the train indicates the stopping of the train determined by the stop-position determination function. Specifically, for example, the term indicates a state where the speed is zero or substantially zero with a service brake activated.

The terminal protection function according to the present embodiment can be implemented even when the SLC 32 fails, Specifically, the SLC 32 has a self-checking function, a failure detection result of which is output to the ground system 50 communicably connected to the SLC 32. When the SLC 32 fails before the train 10 enters the platform track R of the terminal, the stop-position determination and the open/close control on the platform door 42 are disabled. Thus, the around system 50 determines not to use the platform.

When the failure of the SLC 32 occurs or is recognized after the train 10 enters the platform track R, control for stopping the train 10 is performed via the train controller. Specifically, for example, the ground system 50 transmits SLC failure information to the onboard system 20, and the onboard system 20 that has received the failure information on the SLC 32 disposed on the platform track R where the train has entered can activate the emergency brake to stop the train 10. For example, the transmission of the SLC failure information may be implemented by appropriate means including wireless communications through a wireless communication apparatus (not illustrated) installed on the train 10 for example.

The SLC 32 may fail in the state where the SLC 32 is detected by the train 10 that has entered the platform track R, that is, in a state where the train 10 is stopped or substantially stopped as a result of the stop-position determination. In such a case, the train 10 transitions from the state where the SLC 32 is detected (detected state) to a state where the SLC 32 is unable to be detected (non-detected state). Specifically, the detected state of the SLC 32 transitions to the non-detected state before the departure permission information is received, before the train 10 is stopped or after the train 10 is temporarily "stopped", and thus the train 10 can be stopped by activating the emergency brake as in the case illustrated in FIG. 2.

Furthermore, the SLC 32 in a normal state may not be detectable by the train 10 due to communication failure. This can be addressed with a balise DB including information, such as an ID or a disposed position of each balise including the SLC 32 provided at each station, stored in the train 10 in advance. Then, the train 10 failed to detect the SLC 32 despite the traveling position thereof reaching the disposed position of the SLC 32 will be stopped by activating the emergency brake.

Figure 3:
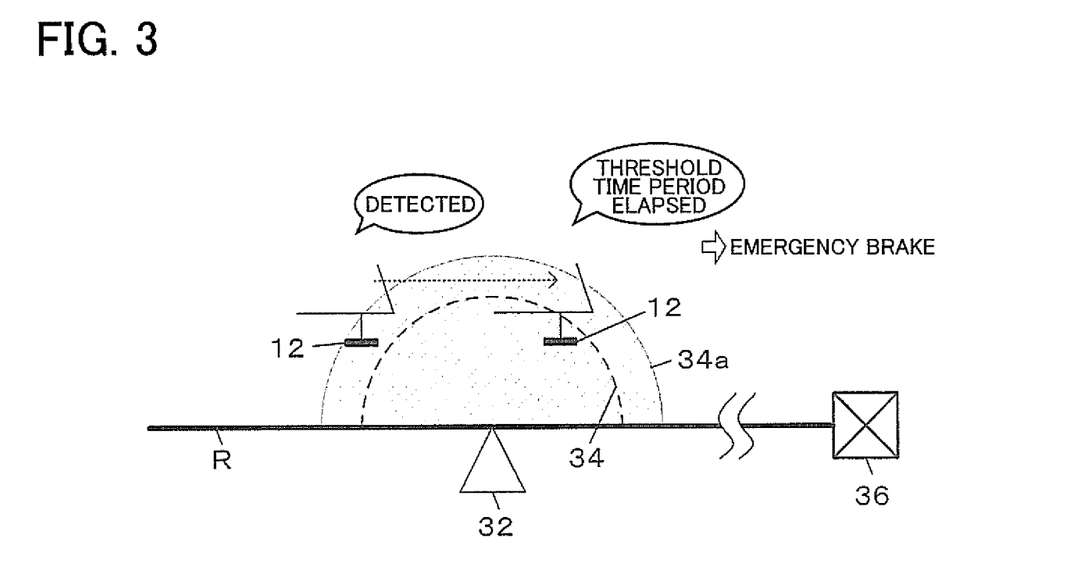
FIG. 3 is a diagram illustrating terminal protection under SLC abnormality.

The signal arriving range might be expanded due to a transmission output of the SLC 32 increased by a certain cause. A resultant signal arriving range 34a includes and is wider than the normal signal arriving range 34. With such a range, the train 10 that has overrun to have the onboard antenna 12 outside the normal signal arriving range 34 of the SLC 32 would remain to be in the state where the SLC 32 is detected as illustrated in FIG. 3. This can be addressed with elapsed time (reception duration) after the detection of the SLC 32 measured, and with the onboard system 20 activating the service brake to stop the train 10 when the elapsed time after the detection reach a predetermined threshold time period. The threshold time period is determined to be a time period required for the train 10, traveling at expected traveling speed as ideal speed when arriving at the signal arriving range of the SLC 32, to pass through the normal signal arriving range of the SLC 32, or to be a time period as a result of adding some safety margin time period to such a time period.

The signal arriving range 34 might be narrowed when the transmission output of the SLC 32 decreases. However, such a range would rather have a positive impact on safety, and thus is not dangerous. Specifically, the train 10 overrunning would fail to detect the SLC 32, so that the emergency brake is activated, before the onboard antenna 12 passes through the resultant normal signal arriving range 34 of the SLC 32. Thus, such an error would not be a problem in terms of terminal protection.

[Functional Configuration]

Figure 4:
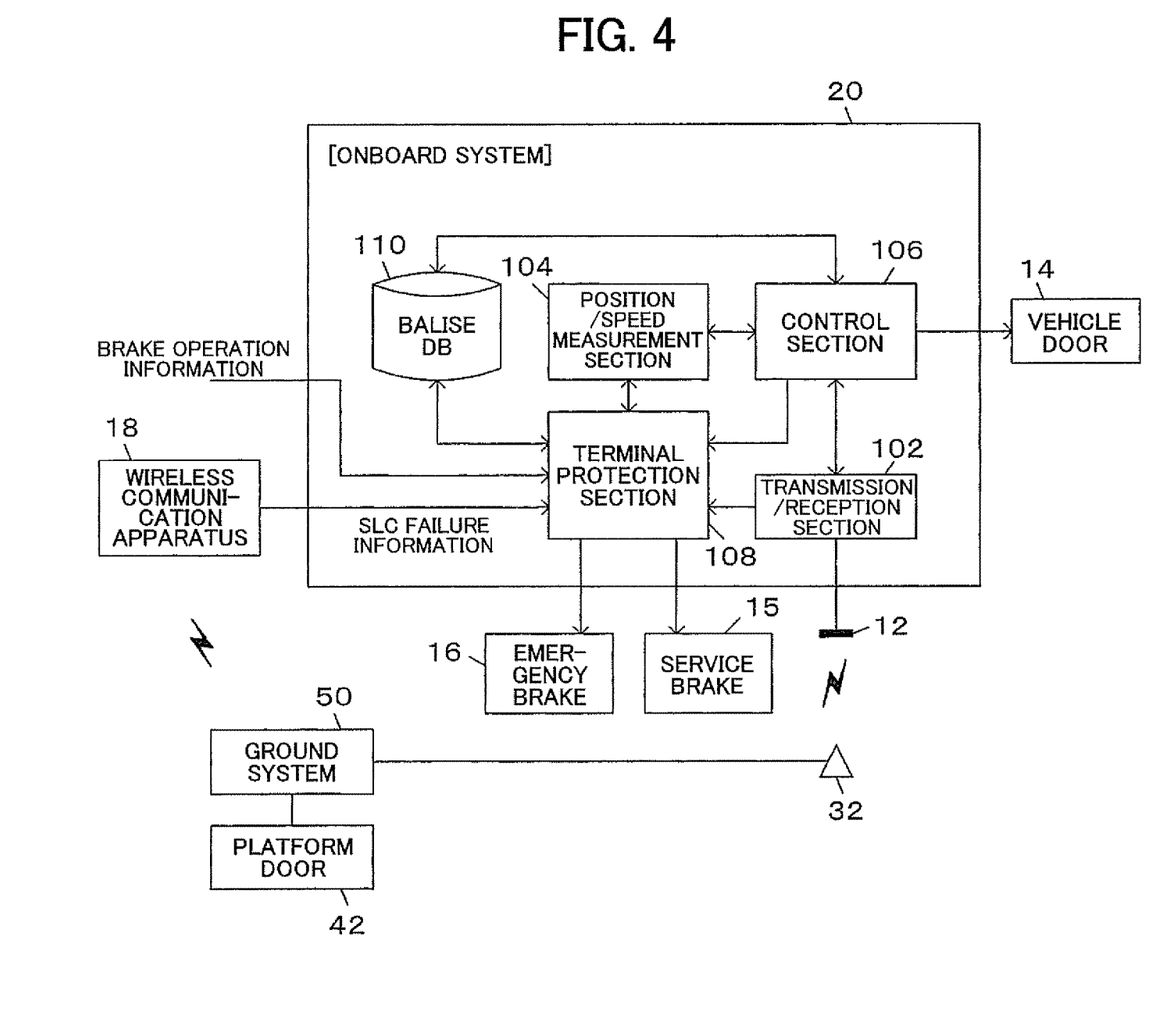
FIG. 4 is a diagram illustrating a functional configuration of an onboard system.

FIG. 4 is a diagram illustrating a functional configuration of the onboard system 20 installed in the train 10. As illustrated in FIG. 4, the onboard system 20 has functional units including a transmission/reception section 102, a position/speed measurement section 104, a control section 106, and a terminal protection section 108, and stores a balise DB 110. The balise DB 110 is a database that stores information, such as ID and a disposed position, on each balise including the SLC 32 disposed at each station.

The transmission/reception section 102 transmits and receives information to and from the balise including the SLC 32 through wireless communications via the onboard antenna 12.

The position/speed measurement section 104 measures a traveling position and traveling speed of the train 10 based on a measurement value of the rotation speed of an axle detected by a tachometer generator. The traveling position measured is corrected by detecting a balise for position correction disposed on the track. Specifically, the traveling speed of the train 10 is obtained based on the measurement value obtained by the tachometer generator, and a traveling distance from the disposed position of the balise for position correction detected is obtained based on the traveling speed, as the traveling position of the train 10.

The control section 106 performs vehicle side control related to ATO including the stop-position determination function. Specifically, when the train is to be stopped at a station, control for stopping the train 10 at the stop target is performed in accordance with the detection of an ATO balise, and the stop-position determination is performed to determine whether or not the train 10 has stopped at the stop target in accordance with the detection of the SLC 32. While the train is stopped at the station, the open/close information on the vehicle doors 14 and the platform doors 42 is received from the ground system 50 via the SLC 32 for performing the open/close control on the platform doors 42 of the platform 40 of the stopped station and the vehicle doors 14 of the train 10, and transmits and receives next stop information related to traveling to the next stop to and from the ground system 50. When the train receives the departure permission information and leaves the station, inter-station traveling control is performed based on the next stop information received, until the next stop is reached.

When the train 10 stops at the terminal, the terminal protection section 108 executes the terminal protection function to prevent the train 10 from running over the stop target 30 to collide with the car stop 36 at the end of the track. Specifically, at the terminal, an emergency brake 16 is activated to stop the train 10, when the train 10 transitions to the state where the SLC 32 is not detected (non-detected state) before being determined to have stopped at the stop-position by the stop-position determination function of the control section 106 after the SLC 32 has been detected. Alternatively, a time period (reception duration) elapsed after the detection of the SLC 32 is measured, and the service brake 15 is activated to stop the train 10 when the reception duration reaches the predetermined time period before the train stops. Alternatively, the balise DB 110 is referred to, and the emergency brake 16 is activated to stop the train 10 when the traveling position of the train 10 reaches the disposed position f the SLC 32 but the SLC 32 is not detected. When the SLC failure information related to the station to be entered is received from the ground system 50 via a wireless communication apparatus 18, the service brake 15 or the emergency brake 16 is activated to stop the train 10. One of the service brake 15 or the emergency brake 16 to be activated is determined in accordance with the distance to the station. The onboard system 20 may be regarded as a terminal protection apparatus due to this function of the terminal protection section 108.

[Process Flow]

Figure 5:
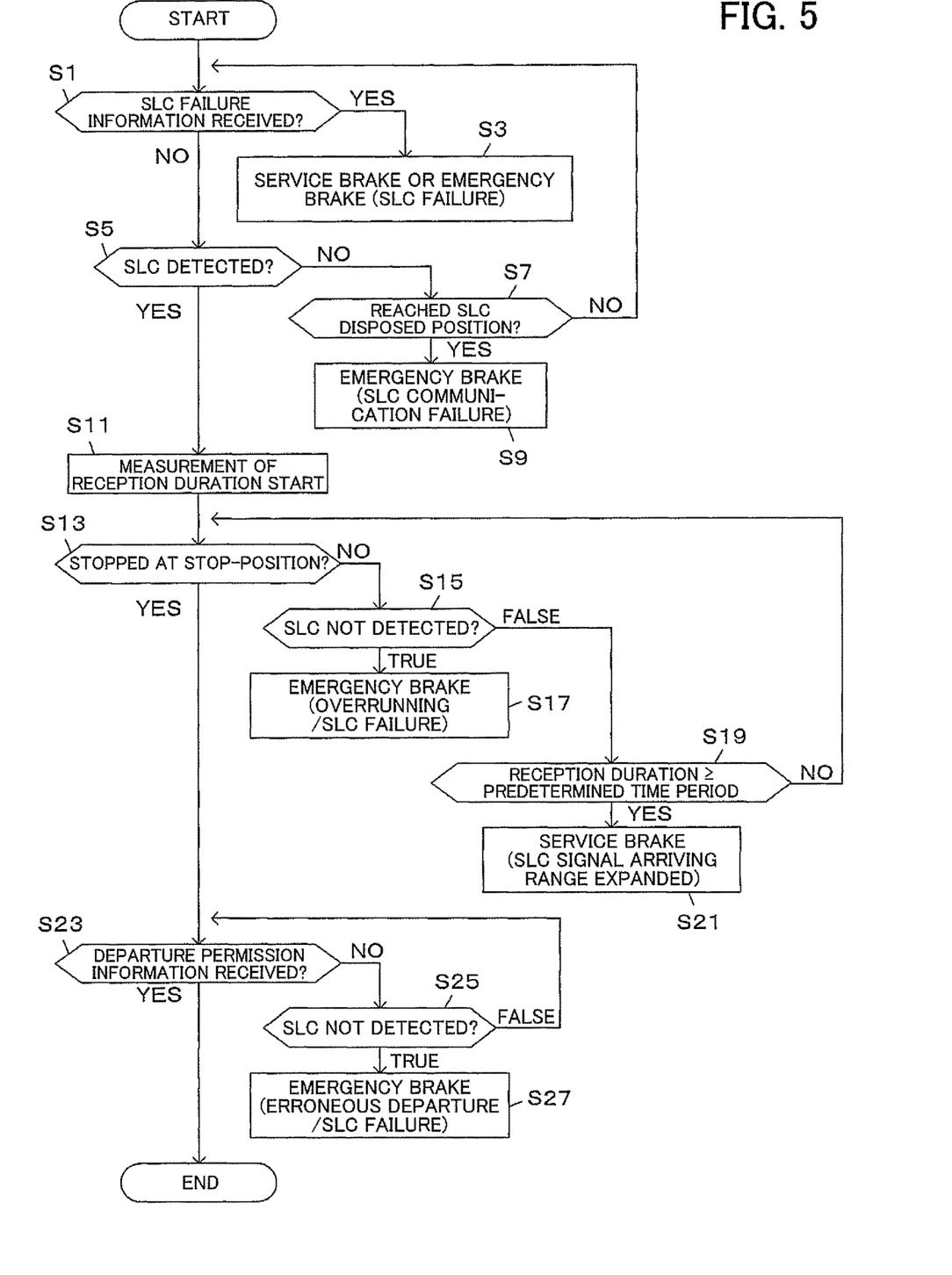
FIG. 5 is a flowchart illustrating a terminal protection process.

FIG. 5 is a flowchart illustrating a flow of a terminal protection process. This process is executed by the onboard system 20 when the train comes close to a predetermined terminal.

In the terminal protection process, first of all, the terminal protection section 108 determines whether the SLC failure information is received from the ground system 50. When the SLC failure information is received (step 1: YES), the service brake 15 or the emergency brake 16 is activated to stop the train (step S3). When the SLC failure information is not received (step 1: NO), whether or not the SLC 32 is detected is determined next. When the SLC 32 is not detected (step S5: NO), whether or not the traveling position of the train 10 has reached the disposed position of the SLC 32 is determined. This determination can be made by comparing the train position measured by the position/speed measurement section 104 and the disposed position of the SLC 32 registered in the balise DB 110. When the traveling position of the train 10 has reached the disposed position of the SLC 32 (step S7: YES), the emergency brake 16 is activated to stop the train 10 (step S9). When the traveling position has not reached the disposed position of the SLC 32 yet (step S7: NO), the process returns to step S1 and the same determination is repeated.

When the SLC 32 is detected (step S5: YES), the reception duration for the SLC 32 is started to be measured (step S11). Next, whether or not the train is stopped at the stop-position by the control section 106 is determined. When the train 10 has not stopped at the stop-position yet (step S13: NO), whether or not the train is in the state where the SLC 32 is not detected is determined next. When the train is in the state where the SLC 32 is not detected (step S15: TRUE), the emergency brake 16 is activated to stop the train 10 (step S17).

When the SLC 32 is still detected (step S15: FALSE), the reception duration is compared with the predetermined threshold time period. When the reception duration reaches or exceeds the threshold time period (step S19: YES), the service brake 15 is activated to stop the train (step S21). When the reception duration has not reached the threshold time period (step S19: NO), the process returns to step S13 and the same determination is repeated. When the train is stopped at the stop-position (step S13: YES), whether or not the departure permission information is received is determined. When the departure permission information is not received (step S23: NO), whether or not the train is in the state where the SLC 32 is not detected is determined. When the train is in the state where the SLC 32 is not detected (step S25: TRUE), the emergency brake 16 is activated to stop the train 10 (step S27), When the SLC 32 is still detected (step S25: FALSE), the process returns to step S23, and the same process is repeated. The process is terminated when the departure permission information is received (step S23: YES).

[Operation and Effect]

As a result, in some embodiments, the SLC 32 that is a powered balise is used for the stop-position determination function so that the terminal protection function for the train 10 can be implemented at a terminal without additionally installing the ground equipment dedicated for the terminal protection. With no ground equipment dedicated for the terminal protection required, a section (safety margin for overrunning) between the stop target 30 and the end of the track can be made shorter than a case where conventional terminal protection implemented with dedicated ground equipment installed is employed.

More specifically, the terminal protection is implemented with the emergency brake 16 activated when the train is in the state where the SLC 32 cannot be detected (non-detected state) before being determined to have stopped at the stop-position by the stop-position determination function after the SLC 32 is detected. In the terminal protection, the service brake 15 is activated also when the reception duration during which the SLC 32 continues to be detected reaches the predetermined threshold time period or when the SLC 32 is not detected by the train 10 the traveling position of which has reached the disposed position of the SLC 32. Furthermore, the service brake 15 or the emergency brake 16 is activated also when the SLC failure information is received from the ground system 50, in accordance with the distance to the stop target at the next stop.

[Modification]

The aspects of the present disclosure are not limited to the above embodiments. Various modifications and variations may be made without departing from the provided subject matter.

In the embodiment described above, the SLC for the stop-position determination in the ATO and the door open/close control is used. Alternatively, a balise disposed near a stop target can be similarly used for these purposes. For example, the terminal protection function can be similarly implemented for the end of a track of a depot, with a powered balise disposed around a stop-position (stop target) before the end of the track. The present embodiment is not limited to the powered balise and may use a non-powered balise.

The present embodiment can be similarly applied to a train control system other than the ATO. For example, the present embodiment can be similarly applied to a train control system where a driver performs a driving operation and an onboard system performs the stop-position determination to support the driver.

What is claimed is:

1. A terminal protection apparatus installed in a train, the train including a receiver that receives a radio signal indicating a stop-position before an end of a track from a balise; and a stop determination function for determining whether or not the train has stopped, the terminal protection apparatus being configured to perform:

measuring a traveling position of the train;

activating the emergency brake when the traveling position of the train reaches a disposed position of the balise before detecting reception of the radio signal transmitted from the balise by the receiver;
detecting the reception of the radio signal by the receiver;
determining continuously by the stop determination function whether or not the train has stopped, until the train stops;
determining whether or not the received signal is no longer received; and
stopping the train before the end of the track by activating an emergency brake in response to the determination that the received radio signal is no longer received, while the stop determination function has not determined that the train has stopped.

2. The terminal protection apparatus as defined in claim 1, further being configured to perform activating the emergency brake when a reception duration during which the detection of the reception of the radio signal reaches a predetermined time period before the stop determination function has determined that the train has stopped.

3. The terminal protection apparatus as defined in claim 2, further being configured to perform activating the emergency brake when the received radio signal is no longer received before given departure permission information is received after the stop determination function has determined that the train has stopped.

4. The terminal protection apparatus as defined in claim 1, further being configured to perform:
receiving failure information on the balise; and
activating the emergency brake in response to the reception of the failure information.

5. The terminal protection apparatus as defined in claim 1, further being configured to perform activating the emergency brake when the received radio signal is no longer received before given departure permission information is received after the stop determination function has determined that the train has stopped.

6. The terminal protection apparatus as defined in claim 1, wherein the radio signal is received by the receiver when the train enters a signal arriving range of the balise and the received signal is no longer received when the train exits the signal range.

7. A terminal protection method executed by an onboard system of a train to activate an emergency brake, the method comprising:
measuring a traveling position of the train;
activating the emergency brake when the traveling position of the train reaches a disposed position of a balise before receiving a radio signal transmitted from the balise by a receiver installed on the train, the radio signal indicating a stop-position before an end of a track;
receiving the radio signal
determining continuously whether or not the train has stopped, until the trains stops;
determining whether or not the received signal is no longer received; and
stopping the train before the end of the track by activating the emergency brake in response to the determination that the received radio signal is no longer received, while it has not been determined that the train has stopped.

8. The terminal protection method as defined in claim 7, further comprising activating the emergency brake when a reception duration during which the detection of the reception of the radio signal reaches a predetermined time period before it has been determined that the train has stopped.

9. The terminal protection method as defined in claim 8, further comprising activating the emergency brake when the received radio signal is no longer received before given departure permission information is received after it has been determined that the train has stopped.

10. The terminal protection method as defined in claim 7, further comprising:
receiving failure information on the balise; and
activating the emergency brake in response to the reception of the failure information.

11. The terminal protection method as defined in claim 7, further comprising activating the emergency brake when the received radio signal is no longer received before given departure permission information is received after it has been determined that the train has stopped.

12. The terminal protection method as defined in claim 7, wherein the radio signal is received by the receiver when the train enters a signal arriving range of the balise and the received signal is no longer received when the train exits the signal range.

13. A terminal protection system, comprising:
a track having a balise that transmits a radio signal indicating a stop-position before an end of the track; and
a train including an emergency brake, a receiver that receives the radio signal and a controller that measures a traveling position of the train, activates the emergency brake when the traveling position of the train reaches a disposed position the balise before receiving the radio signal transmitted from the balise by the receiver, determines continuously whether or not the train has stopped, until the train stops, determines whether or not the received signal is no longer received, and stops the train before the end of the track by activating the emergency brake in response to the determination that the received signal is no longer received, while it has not been determined that the train has stopped.

14. The terminal protection system as defined in claim 13, wherein the radio signal is received by the receiver when the train enters a signal arriving range of the balise and the received signal is no longer received when the train exits the signal range.

* * * * *